United States Patent
Cámara Puerto et al.

(10) Patent No.: US 11,977,378 B2
(45) Date of Patent: May 7, 2024

(54) VIRTUAL PATH GUIDANCE SYSTEM

(71) Applicant: SUBSITE, LLC, Perry, OK (US)

(72) Inventors: Victor D. Cámara Puerto, Stillwater, OK (US); Benjamin Ryan Travers, Argyle, TX (US)

(73) Assignee: The Charles Machine Works, Inc., Perry, OK (US)

(*) Notice: Subject to any disclaimer, the term of this patent is extended or adjusted under 35 U.S.C. 154(b) by 722 days.

(21) Appl. No.: 16/572,012

(22) Filed: Sep. 16, 2019

(65) Prior Publication Data
US 2020/0089222 A1    Mar. 19, 2020

Related U.S. Application Data

(60) Provisional application No. 62/732,027, filed on Sep. 17, 2018.

(51) Int. Cl.
| | | |
|---|---|---|
| *G05D 1/00* | (2006.01) | |
| *E02F 5/06* | (2006.01) | |
| *E02F 5/14* | (2006.01) | |
| *G05D 1/02* | (2020.01) | |
| *G06V 20/56* | (2022.01) | |

(52) U.S. Cl.
CPC ............ *G05D 1/0038* (2013.01); *E02F 5/06* (2013.01); *E02F 5/145* (2013.01); *G05D 1/0088* (2013.01); *G05D 1/0212* (2013.01); *G05D 1/0231* (2013.01); *G05D 1/0278* (2013.01); *G06V 20/588* (2022.01)

(58) Field of Classification Search
CPC .. G05D 1/0038; G05D 1/0088; G05D 1/0212; G05D 1/0231; G05D 1/0278; G06K 9/00798
See application file for complete search history.

(56) References Cited

U.S. PATENT DOCUMENTS

| | | | |
|---|---|---|---|
| 7,742,860 B2 * | 6/2010 | Diekhans | G01C 21/20 |
| | | | 701/410 |
| 10,344,450 B2 | 7/2019 | Sharp et al. | |
| 10,528,056 B2 * | 1/2020 | Zhang | G01C 21/3647 |
| 11,110,470 B2 * | 9/2021 | Smith | A01M 7/0089 |
| 2010/0241289 A1 * | 9/2010 | Sandberg | B25J 9/1689 |
| | | | 701/2 |

(Continued)

*Primary Examiner* — Peter D Nolan
*Assistant Examiner* — Mikko Okechukwu Obioha
(74) *Attorney, Agent, or Firm* — Tomlinson McKinstry, P.C.

(57) ABSTRACT

A guidance system for remotely guiding a work machine along a virtual path. The system uses a vision system to capture image data representative of areas surrounding the work machine. The image data is used to produce a spatial map. Analysis of image data allows the work machine's then-current position to be represented on the spatial map. A virtual path extending from the work machine's position is next added to the spatial map. The virtual path may be generated in response to external input provided at the display showing an image of the spatial map. Using continuously-updated image data, the work machine is driven toward the virtual path. During operation, the actual path of the work machine is compared to the virtual path. If any deviation between the paths is detected, the trajectory of the work machine is automatically adjusted.

19 Claims, 15 Drawing Sheets

(56) References Cited

U.S. PATENT DOCUMENTS

| | | | |
|---|---|---|---|
| 2012/0140039 A1* | 6/2012 | Ota | B60W 30/12 348/148 |
| 2014/0163775 A1 | 6/2014 | Metzler | |
| 2016/0152232 A1* | 6/2016 | Takahashi | B62D 5/0463 701/41 |
| 2016/0271795 A1* | 9/2016 | Vicenti | B25J 9/163 |
| 2016/0312446 A1 | 10/2016 | Pettersson et al. | |
| 2017/0168501 A1* | 6/2017 | Ogura | G05D 1/0278 |
| 2017/0188510 A1* | 7/2017 | Einecke | H04N 7/183 |
| 2018/0122245 A1 | 5/2018 | Penilla et al. | |
| 2018/0164117 A1* | 6/2018 | Sakaguchi | G06V 30/422 |
| 2018/0206391 A1* | 7/2018 | Shinkai | G05D 1/0268 |
| 2018/0208242 A1* | 7/2018 | Sakaguchi | A01B 69/008 |
| 2018/0209799 A1* | 7/2018 | Uoya | G01C 21/005 |
| 2019/0208695 A1* | 7/2019 | Graf Plessen | A01B 69/007 |
| 2019/0343035 A1* | 11/2019 | Smith | A01B 79/005 |
| 2020/0166350 A1* | 5/2020 | Gitz | B60R 1/00 |

\* cited by examiner

VIRTUAL PATH GUIDANCE SYSTEM

SUMMARY

The present invention is directed to a method comprising the steps of capturing image data representative of one or more scenes in the vicinity of a self-propelled work machine, and locating the work machine in relation to the imaged vicinity. The method further comprises the steps of receiving data about a virtual path for the work machine, the virtual path originating at the machine's then-current location, driving the work machine along an actual path, and comparing the actual path of the driven work machine to the virtual path.

The present invention is also directed to a system comprising a self-propelled work machine and a camera supported on the work machine and configured to capture image data representative of one or more scenes in the vicinity of the work machine. The system further comprises a processor in communication with the camera. The processor is configured to create a three-dimensional map of the vicinity from the image data, locate the work machine within the map, receive within the map a virtual path for the work machine, the virtual path originating at the work machine's determined location, and compare the actual path of the work machine to the virtual path.

DETAILED DESCRIPTION

Figure 1:
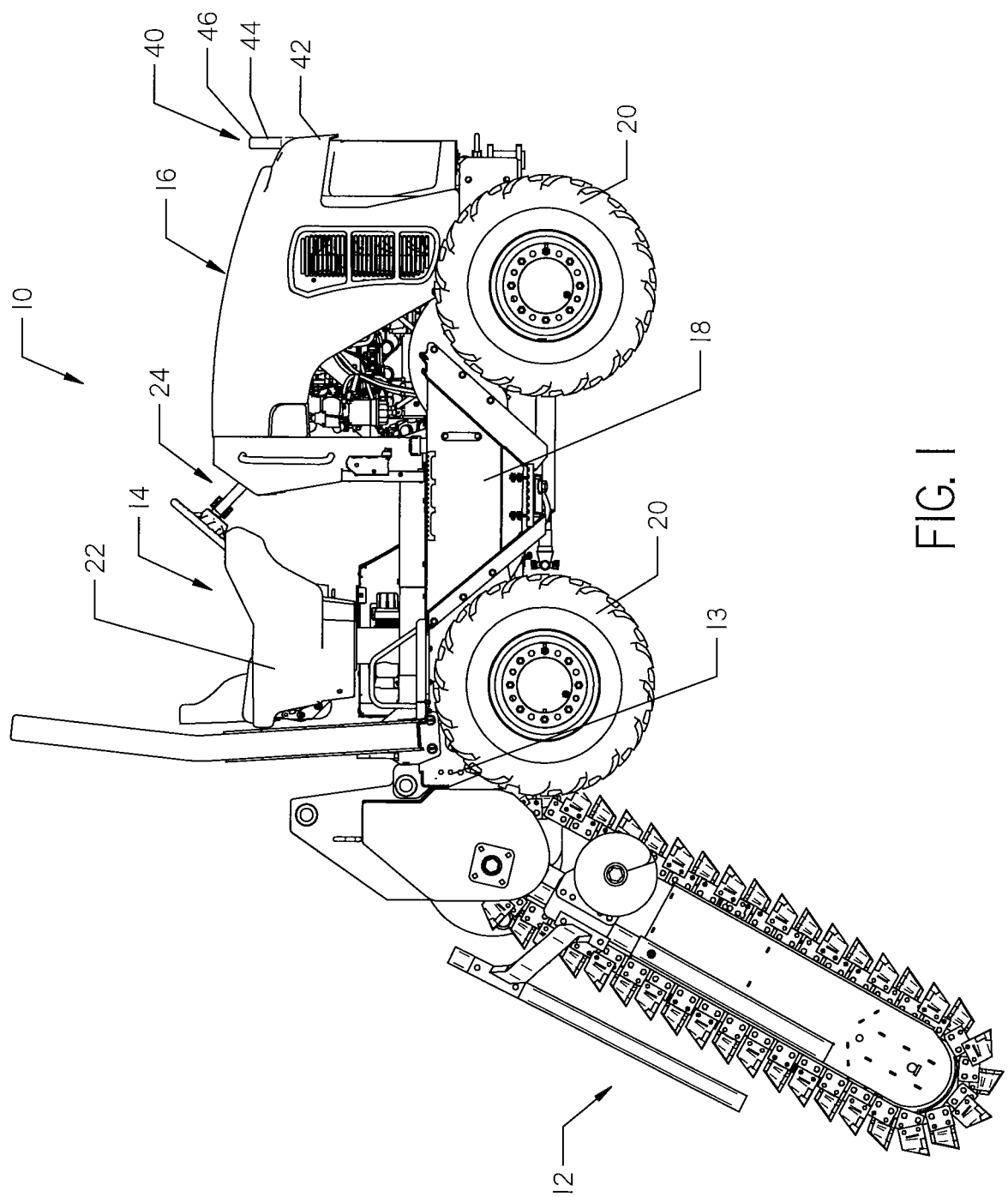
FIG. 1 is a right side elevational view of a work machine carrying a work tool. A vision system is supported on the front of the work machine.
Figure 2:
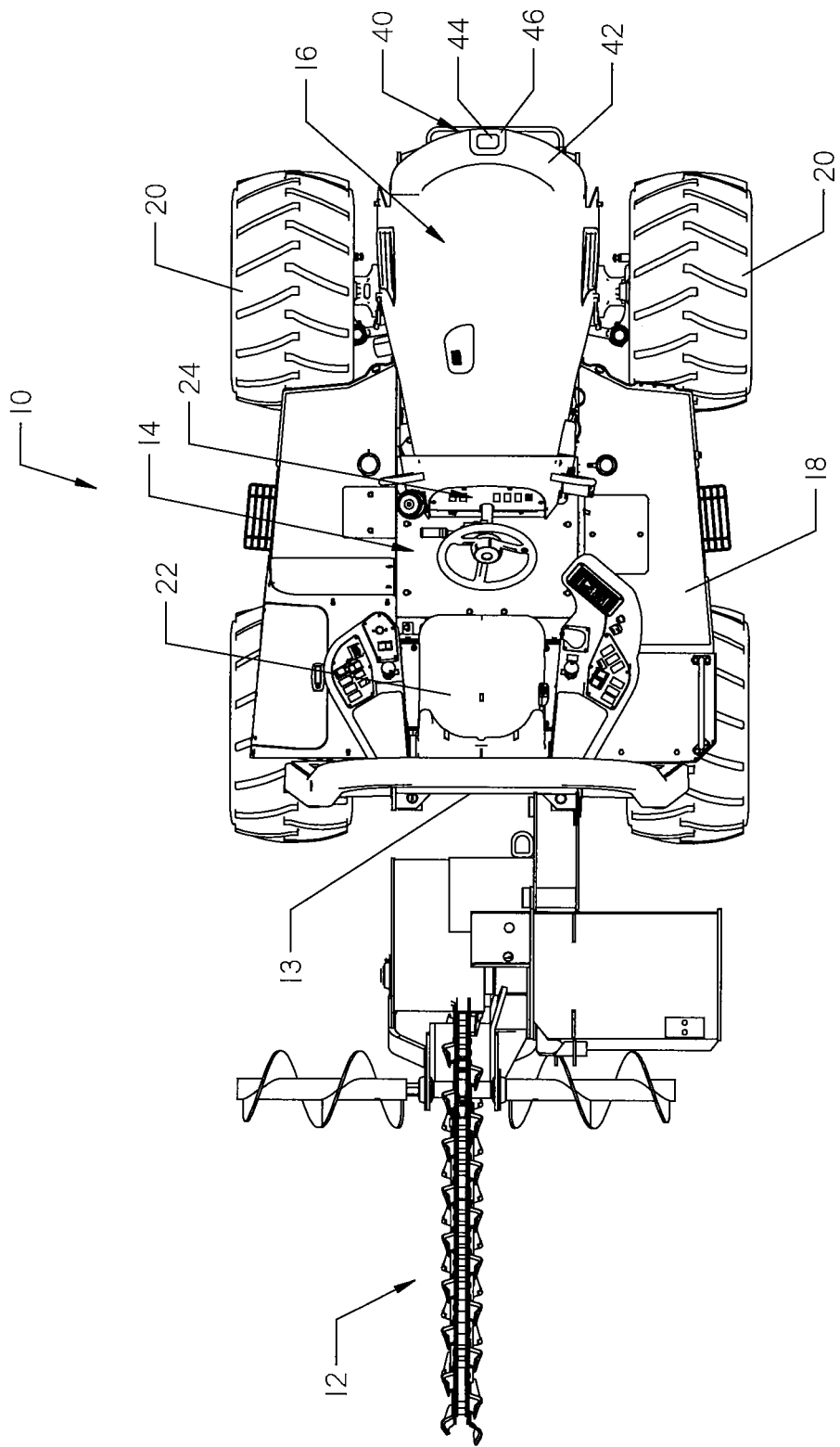
FIG. 2 is a top plan view of the work machine shown in FIG. 1.

With reference to FIGS. 1 and 2, a work machine 10 having a work tool 12 attached to its rear end 13 is shown. The work tool 12 shown in FIGS. 1 and 2 is a trenching blade. In alternative embodiments, the work tool may be a micro-trenching blade or a vibratory plow. In operation, the work machine 10 pulls the work tool 12 along a desired path as the work tool 12 cuts a trench in the ground surface.

The work machine 10 comprises an operator station 14 and an engine compartment 16 supported on a frame 18. A plurality of motive elements 20 are attached to the frame 18. The motive elements 20 shown in FIGS. 1 and 2 are wheels. In alternative embodiments, the motive elements may be a set of endless tracks. The operator station 14 includes a seat 22 and a plurality of controls 24. An operator may ride on the work machine 10 as the machine moves during operation.

Figure 3:
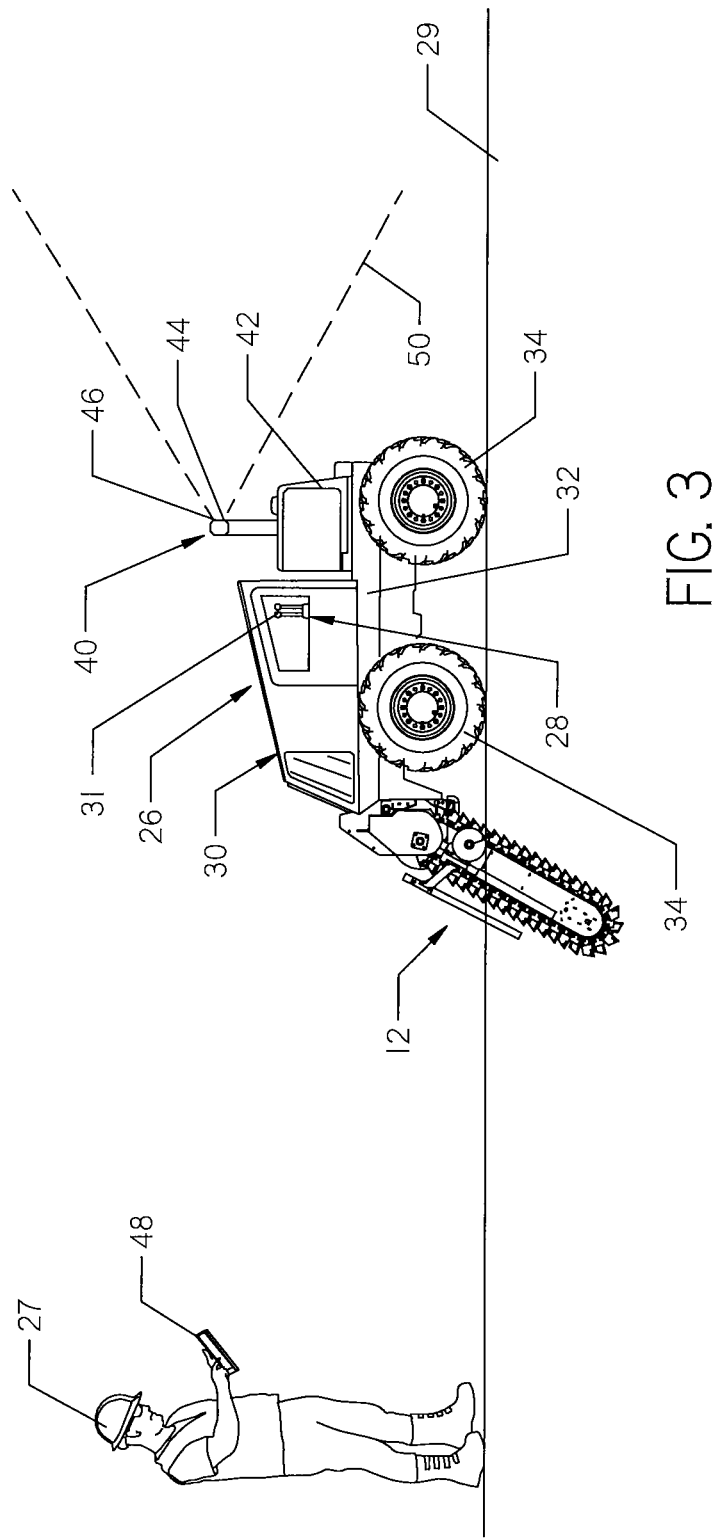
FIG. 3 is an illustration of a guidance system. A second embodiment of a work machine carrying a work tool is shown positioned on a ground surface. A vision system is supported on the front of the work machine, and an operator is positioned remote from the work machine and is holding a tablet.

An alternative embodiment of a work machine 26 is shown in FIG. 3. The work machine 26 comprises an operator station 28 and an engine compartment 30 supported on a frame 32. A plurality of motive elements 34 are attached to the frame 32. The motive elements 34 shown in FIG. 3 are wheels. In alternative embodiments, the motive elements may be a set of endless tracks. The operator station 28 includes a plurality of controls 31, but no seat. An operator 27 may stand or walk next to the operator station 28 while the machine moves during operation. In another embodiment, the work machine may include a platform for the operator to stand on while the machine moves during operation.

Continuing with FIGS. 1-3, the operator 27 may desire to steer the work machine 10 or 26 remotely. Active remote steering may be accomplished using a remote control. Alternatively, the work machine 10 or 26 may be programmed to follow a planned path. For example, GPS coordinates for a planned path may be obtained by comparing the path to a georeferenced map. Such GPS coordinates are uploaded to a processor included in the work machine 10 or 26. During operation, the processor utilizes an onboard GPS receiver to follow the GPS coordinates for the planned path as the work machine 10 or 26 moves along the ground surface 29.

The operator 27 may not always have a planned path to upload to the work machine 10 or 26 prior to operation. The present disclosure is directed to a guidance system for planning a path on-site immediately prior to operation and without the use of a georeferenced map. The guidance system is configured to create a virtual path 38, as shown for example in FIGS. 5 and 10, for the work machine 10 or 26 to follow during operation. The virtual path 38 is mapped using spatial measurements of the environment surrounding the work machine 10 or 26, as shown for example in FIG. 5.

Continuing with FIGS. 1-3, the guidance system utilizes a vision system 40 positioned at a front end 42 of the work machine 10 or 26. In an alternative embodiment, the vision system may be suspended over the work machine on a boom. The vision system 40 comprises at least one camera 44 and one or more sensors 46. The camera 44 is preferably a standard video camera. The one or more sensors 46 may include a 3D sensor, any type of GNSS receiver, such as GPS, cellular data receiver, inertial measurement unit, time of flight sensor, inclinometer, compass, accelerometer, elevation sensor, gyroscope, magnetometer, altimeter, or other desired sensors. One or more of the sensors 46 used as part of the vision system 40 may be positioned in the operator station 14 or 28 instead of the front of the work machine 10 or 26.

The vision system 40 is in communication with a processor positioned either onboard or remote from the work machine 10 or 26. The processor is preferably included in the operator station 14 or 28. The vision system 40 and the processor are both in communication with a remote human machine interface or display 48, as shown in FIGS. 3 and 9-13. The display 48 may be part of a smart phone, tablet, or laptop and may have a touchscreen or be controlled by a keyboard and mouse.

Figure 6:
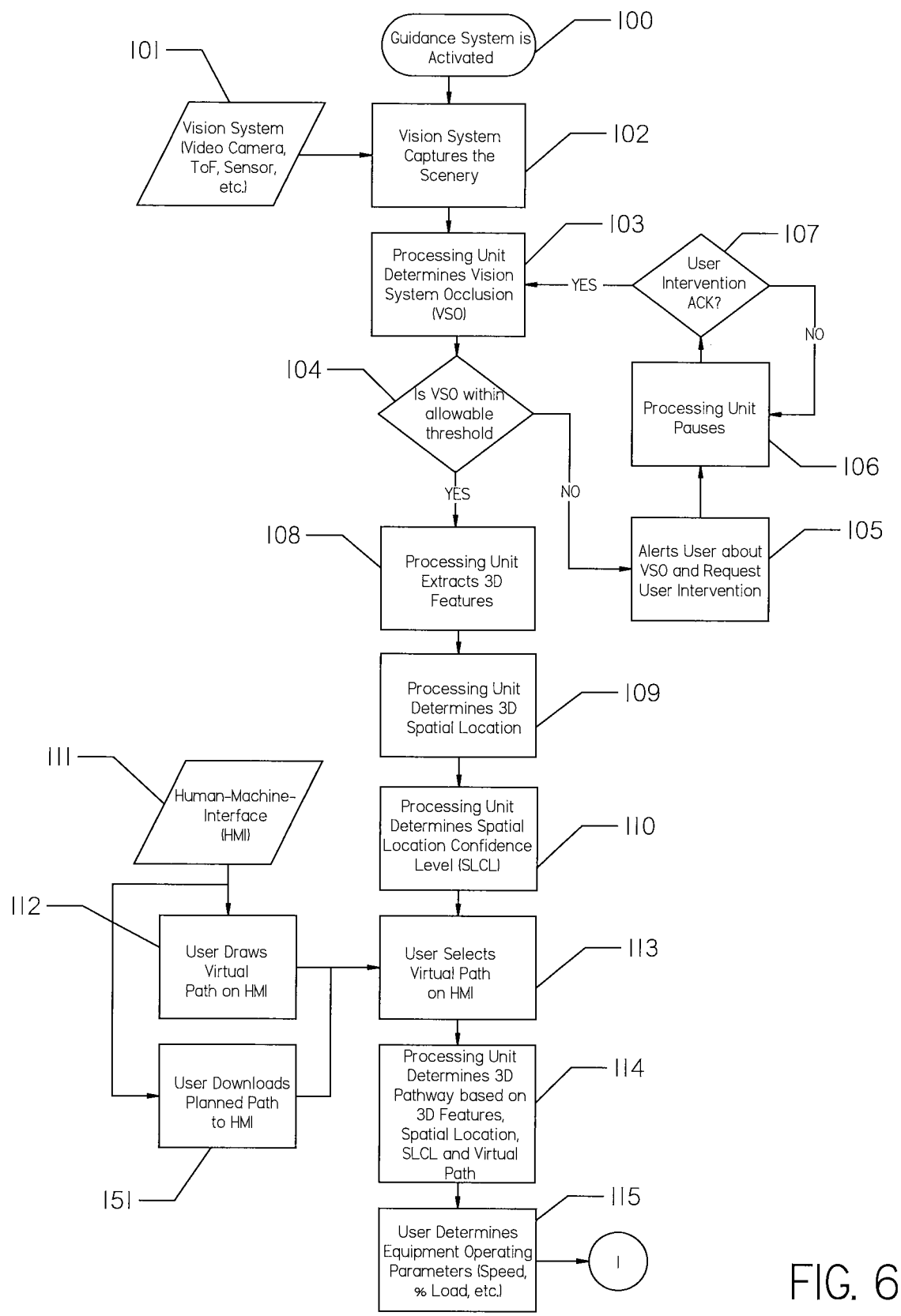
FIG. 6 is a flow chart illustrating steps in the use of a guidance system.
Figure 7:
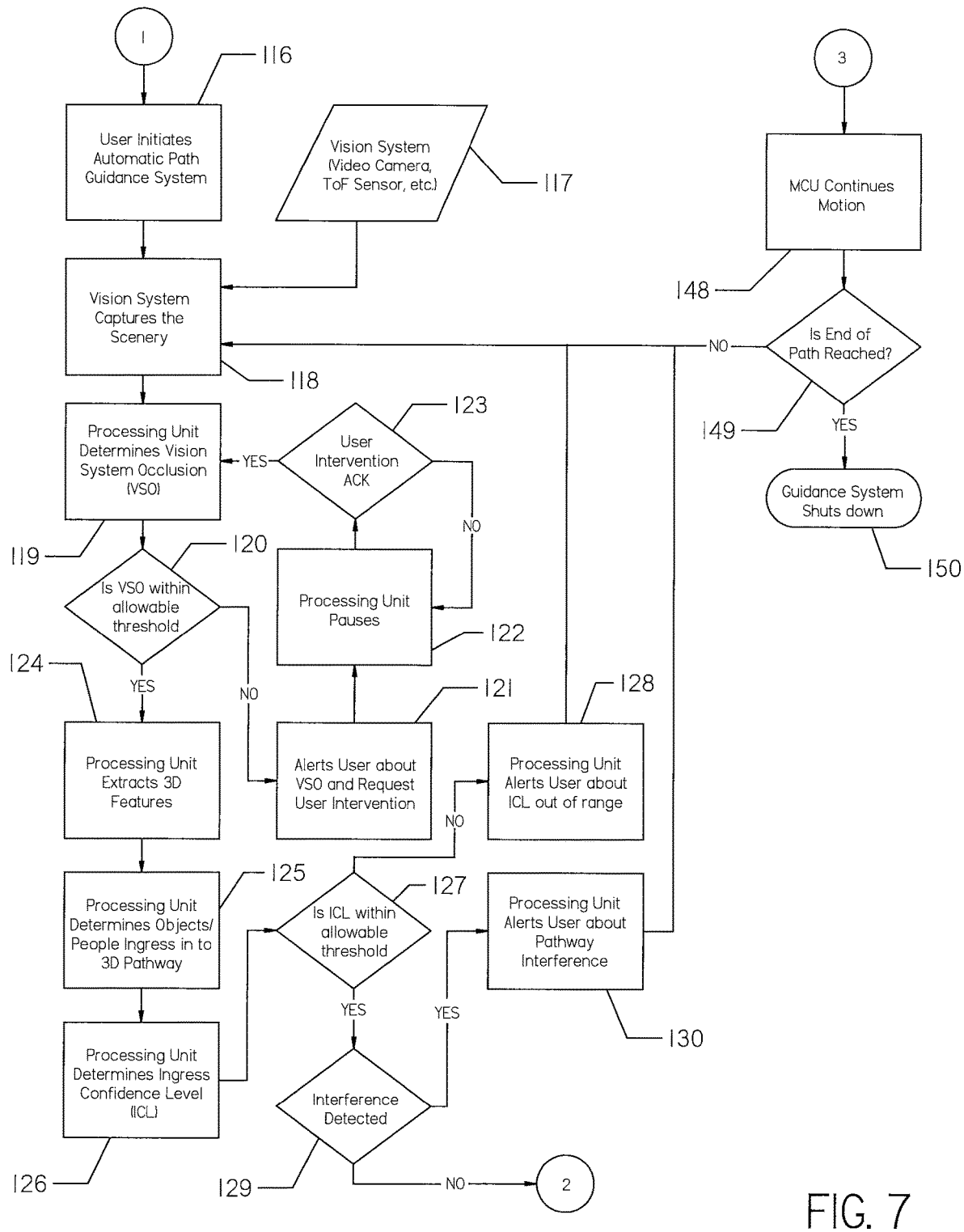
FIG. 7 is a continuation of the flow chart of FIG. 6.
Figure 8:
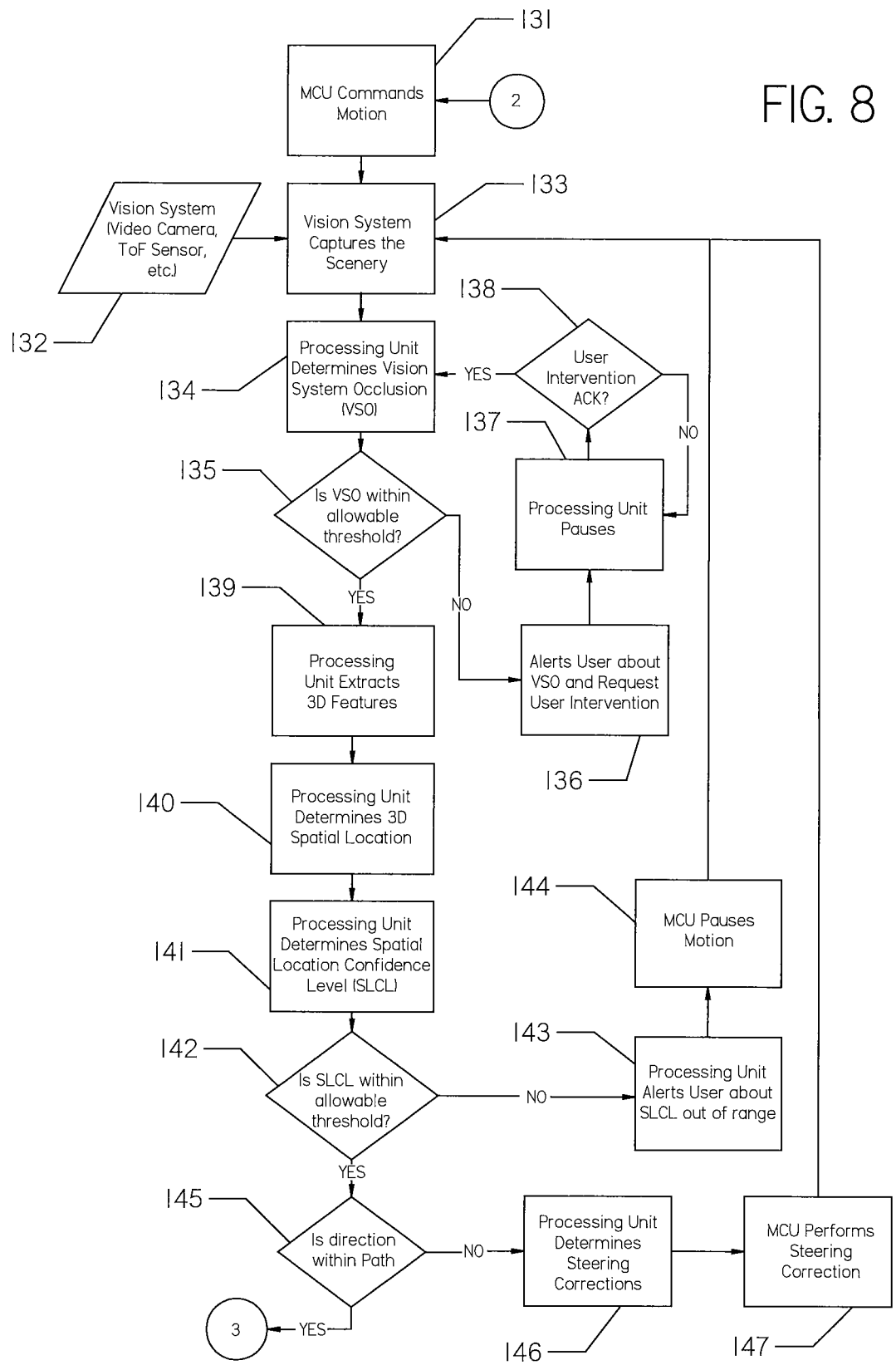
FIG. 8 is a continuation of the flow chart of FIGS. 6 and 7.

Turning to FIGS. 6-8, a method of using the guidance system will be described with reference to the work machine 26 shown in FIG. 3. The same method is used with the work machine 10 shown in FIGS. 1 and 2, or any other desired configuration of a work machine.

To start, the work machine 26 is placed at the start of a desired path so that the camera's field of view 50 faces the desired path and its surrounding environment, as shown in FIG. 3. The guidance system, once activated, directs the camera 44 to capture image data of one or more scenes in the vicinity of the work machine 26, as shown by steps 100-102 in FIG. 6. If a 3D sensor is used with the vision system 40, the 3D sensor will also capture image data of one or more scenes in the vicinity of the work machine 26. The captured image data is transmitted to the processor.

Continuing with FIG. 6, the processor analyzes the image data and determines any vision system occlusion, as shown by steps 103-107. For example, the processor looks for any "holes" or unmapped pixels within the image data. The "holes" or unmapped pixels are generally caused by a dirty lens or debris in front of the camera 44 or sensor 46. If the detected occlusion is unacceptable, the processor will direct an operator to clear the debris or take other necessary steps to remedy the detected occlusion.

Once the image data is acceptable, the processor will create a 3D spatial map of the imaged vicinity. The spatial map is used to measure the distance between the camera 44 and objects within the environment surrounding the work machine 26 and the desired path.

The spatial map is created by converting the image data in 3D images. One method of making such conversion is by using structure-from-motion (SfM) software. The SfM software creates a 3D point cloud of the imaged vicinity. Another method is to overlap the 2D images captured by the camera 44 with the 3D data frames captured by a 3D sensor included in the one or more sensors 46. The 2D images are related to the 3D sensor data frames by relating a point in each 3D sensor data frame to a pixel in each 2D image. Such relation is based on the known physical geometry of the positioning of the 3D sensor relative to the camera 44. Other known methods, such as using a SLAM algorithm, may also be used.

Figure 4:
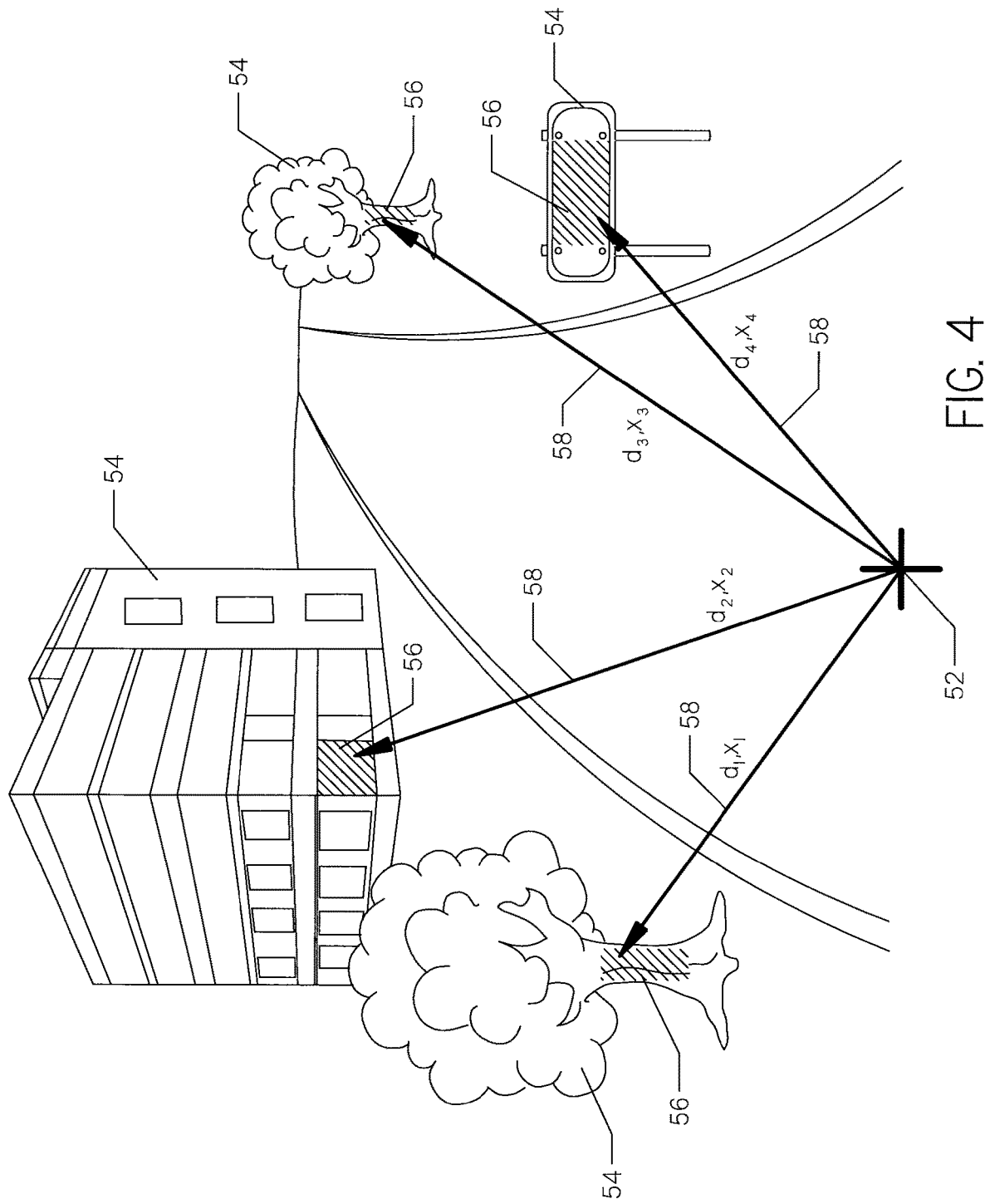
FIG. 4 shows a spatial map produced by the guidance system. The map is generated in response to image data captured by the vision system mounted on the work machine shown in FIGS. 1 and 2 or 3. The position of the work machine, and vectors used to construct the map are also shown.

With reference to FIG. 4, once the spatial map is created, the processor will locate a position of the camera 44 within the map. The position of the camera 44 is located by identifying visual clues in the image data, such as the location of the horizon. The camera's position is also located by analyzing the data gathered by the sensors 46, such as the orientation and compass heading of the camera 44. The located position of the camera 44, as shown by a target symbol 52, may be assigned coordinates within the spatial map.

Continuing with FIGS. 4 and 6, the processor will also recognize and identify 3D features 54 within the image data, such as buildings, signs, or trees. Once identified, a position of each of the 3D features 54 will be located within the spatial map, as shown by step 108. The processor will pick an anchor point 56 within each of the features 54 to assign coordinates within the map. The spatial positioning between the camera 44 and each of the anchor points 56 is measured using the assigned coordinates, as shown by step 109. The measurements may include the distance (d) and angle (x) between the assigned coordinates within the map, as shown for example by vectors 58 in FIG. 4.

The processor also analyzes its spatial location confidence level, as shown by step 110. The processor is programmed to calculate its relative position based on its direction of travel and speed. As the work machine 26 moves farther forward, the processor's confidence level about its current position may decrease. The guidance system increases the spatial location confidence level of the processor by providing measurements for the processor to reference while moving. If the processor believes it obtained acceptable spatial measurements, the processor's confidence level will be within acceptable thresholds. If there is a detected error within measurements, the confidence level will be outside of acceptable thresholds. In such case, the processor may require user intervention to correct the error.

Figure 9:
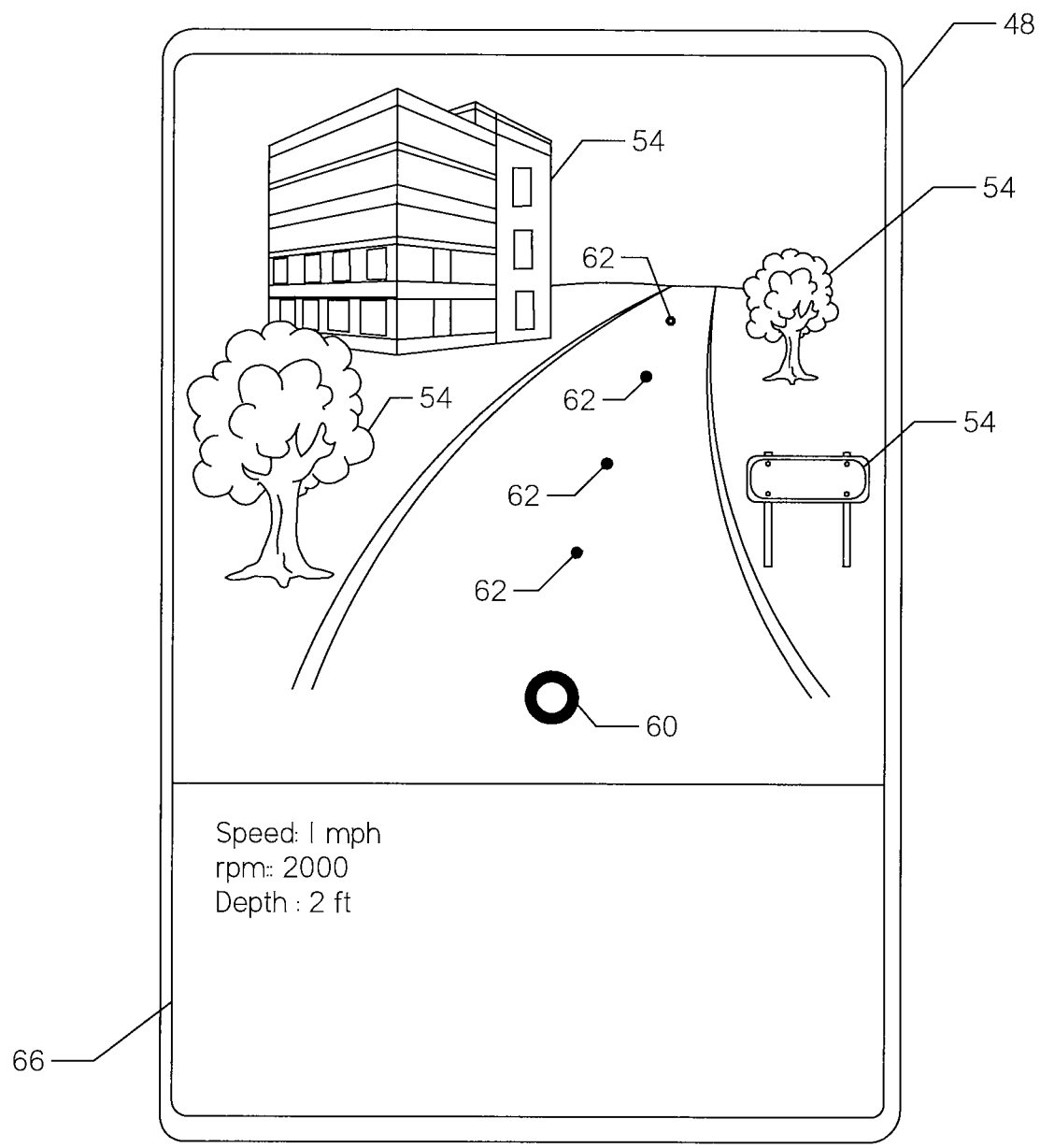
FIG. 9 is a front elevation view of a display for the guidance system, showing an image of the spatial map of FIG. 4. Waypoints extending from the position of the work machine are shown on the display.
Figure 10:
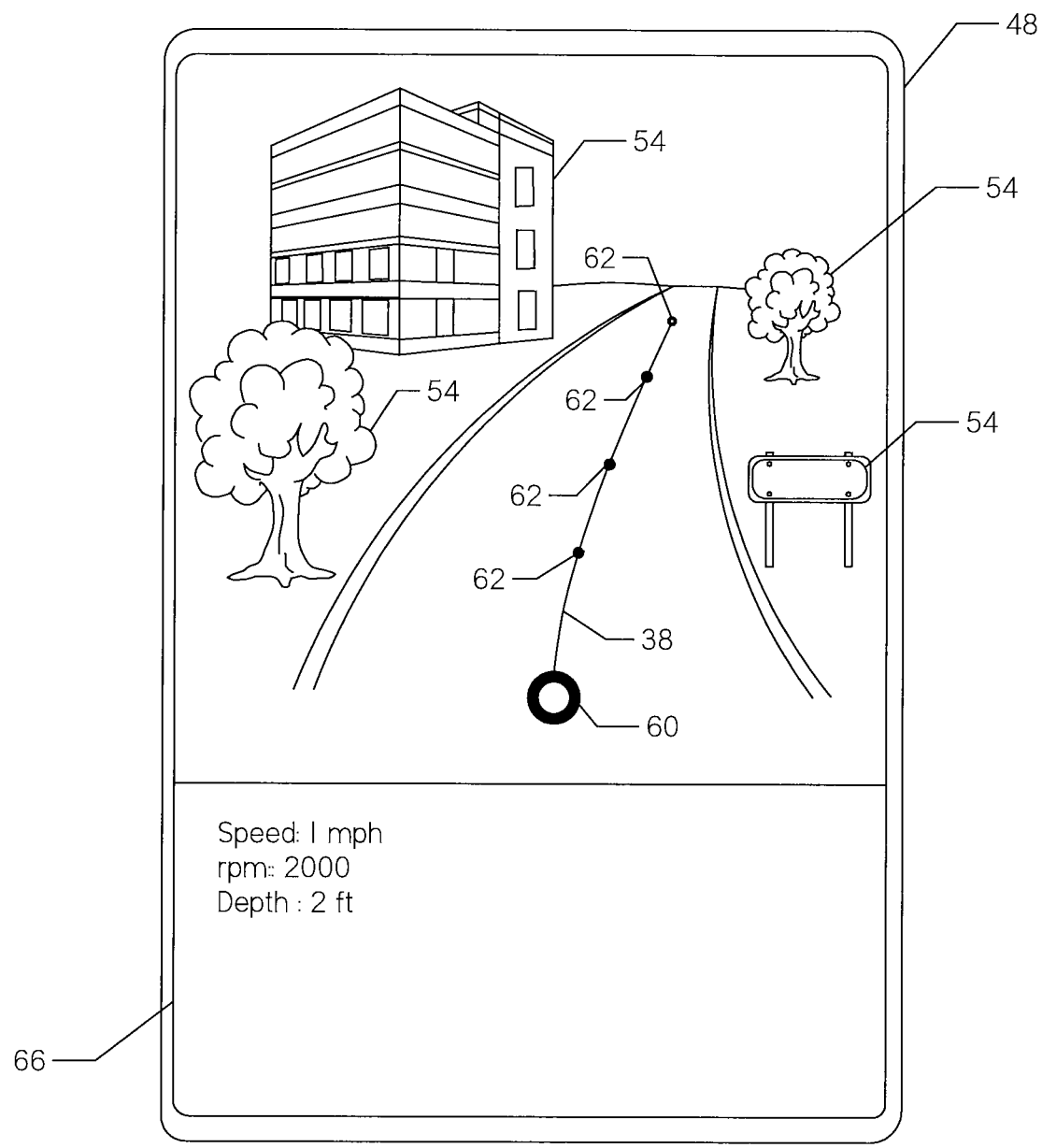
FIG. 10 shows the display of FIG. 9 at a later stage of operation of the guidance system. The work machine's position and waypoints have been interconnected to form a virtual path.

Turning to FIGS. 6, 9 and 10, one or more images of the spatial map are sent to the remote display 48 for use in creating the virtual path 38, as shown by steps 111-113 in FIG. 6. The located position of the camera 44 may be shown on the displayed images as a target symbol 60, as shown in FIGS. 9 and 10.

In order to create the virtual path 38, the operator 27 may input a plurality of waypoints 62 on the image that originate from the target symbol 60, as shown in FIG. 9. The processor may automatically connect the waypoints 62 to create the virtual path 38, as shown in FIG. 10. Alternatively, the operator may create the virtual path 38 by inputting a line on the displayed image and the processor may subsequently identify a plurality of waypoints 62 within the line.

Figure 5:
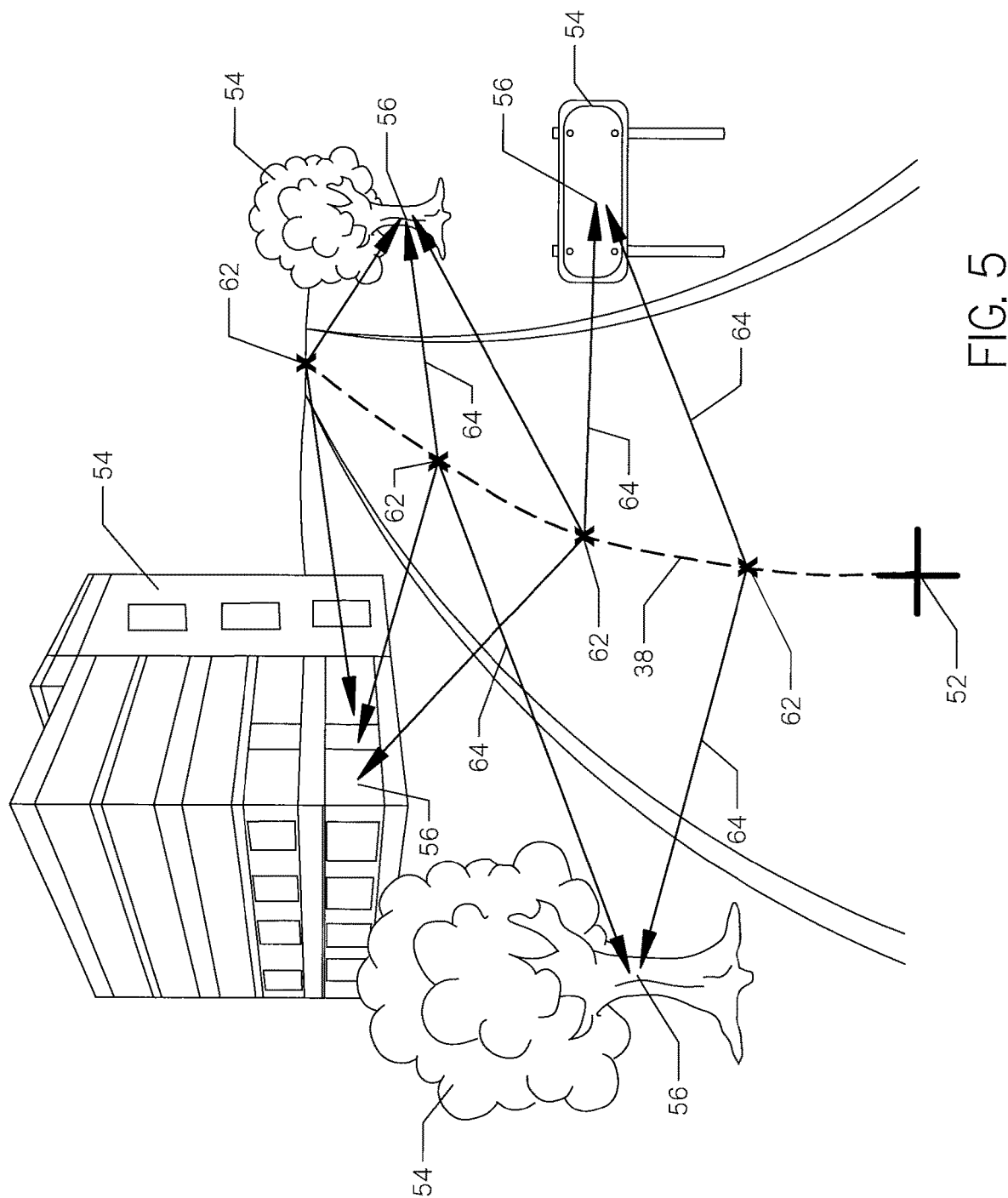
FIG. 5 shows the spatial map of FIG. 4, to which a virtual path has been added. Vectors used to construct the virtual path are also shown.

With reference to FIGS. 5 and 6, once the processor receives data about the virtual path 38, the processor may assign the waypoints 62 coordinates within the spatial map. The processor will subsequently measure the spatial positioning between the waypoints 62, the camera 44, and each of the anchor points 56, as shown by step 114. The measurements may be based on the distance (d) and angle (x) between the assigned coordinates within the map, as shown for example by vectors 64 in FIG. 5.

Continuing with FIGS. 6, 9 and 10, prior to activating the work machine 26, the operator may select the operating parameters for the work machine 26, as shown by step 115. Such parameters may include the speed, rpm, motor load, depth of work tool, etc. The parameters may be selected on the remote display 48, as shown for example in box 66 in FIGS. 9-13.

Turning to FIG. 7, before the work machine 26 starts moving forward, the guidance system will check for any interference with the virtual path 38. For example, debris or a person may be positioned on or adjacent the virtual path 38. In order to look for any interference, the vision system 40 will again capture image data representative of the scenes in the vicinity of the work machine 26, as shown by step 116-118. The image data will subsequently be analyzed for any occlusion, as shown by steps 119-123.

If the image data is acceptable, the processor will convert the image data into a 3D spatial map using one of the methods discussed above. Any identified 3D features 54 within the image data will have coordinates assigned to the feature's anchor points 56, as shown by step 124. The spatial positioning between the camera 44 and anchor points 56 will be measured using the newly assigned coordinates for the anchor points 56 and the previously assigned coordinates for the camera 44, as shown by step 125. Likewise, the spatial positioning between the waypoints 62 and anchor points 56 will be measured using the newly assigned coordinates for the anchor points 56 and the previously assigned coordinates for the waypoints 62, as shown by step 125.

The processor will also analyze its confidence level of such measurements, as shown by steps 126-128. If the processor determines that the measurements are acceptable, the processor will analyze whether any 3D features 54 are too close to the camera 44 or the virtual path 38, as shown by step 129. If so, the processor will alert the operator of interference, as shown by step 130. The operator may modify virtual path 38 or clear the interference before starting operation.

Turning to FIG. 8, if no interference is detected, the processor will activate automatic movement of the work machine 26. The processor will direct the work machine 26 to engage the work tool 12 with the ground surface 29, as shown in FIG. 3, and start driving forward along an actual path, as shown by step 131. As the work machine 26 moves forward, the work tool 12 creates a trench in the ground surface 29.

Continuing with FIG. 8, as the work machine 26 moves forward, the vision system 40 continuously captures image data of the scenes surrounding the machine, as shown by steps 132 and 133. The processor subsequently analyzes the image data for any occlusion, as shown by steps 134-138.

If the images are acceptable, the processor will continuously convert the images into a 3D spatial map using the above described methods. As the work machine 26 moves, the processor will continually locate the position of the camera 44 within the spatial map. The position of the camera 44 is located using visual clues within the image data and data obtained from the one or more sensors 46, such as speed, distance traveled, compass heading, acceleration, and inclination. The processor will also continually locate a position of anchor points 56 within identified 3D features 54, as shown by step 139.

Coordinates will be assigned to the located position of the camera 44 and anchor features 56 so that the spatial positioning between the coordinates may be measured, as shown by step 140. The processor's spatial location confidence level is then analyzed, as shown by step 141-144. If the confidence level is acceptable, the processor will continually analyze the spatial positioning measured between the camera 44, waypoints 62, and anchor points 56. Such measurements are analyzed in order to continually look for any interference with the virtual path 38, as shown by steps 126-130 in FIG. 7. If interference is detected, the processor may be configured to stop forward movement of the work machine 26 and/or stop movement of the work tool 12.

In order to guide the work machine 26 along the virtual path 38, the position of the camera 44 relative to the anchor points 62 is compared to the position of the waypoints 62 relative to the anchor points 62. Because the virtual path 38 represents the intended path for the trench created by the work tool 12, the actual path driven by the work machine 26 is analyzed based on the position of the work tool 12, not the camera 44. Therefore, the processor is programmed to account for the distance between the work tool 12 and camera 44 when locating a position of the work machine's actual path. The processor accounts for the varying distance for all ranges of motion of the work tool 12 and work machine 26. For example, the distance may vary if the work machine 12 is moving straight versus turning. A separate GPS receiver may also be supported on the work tool 12 and be in communication with the processor to further locate the position of the work tool 12 relative to the camera 44.

The processor guides the work machine 26 along the virtual path 38 by continually comparing the actual path of the work tool 12 to the virtual path 38, as shown by step 145. If any deviation is detected between the actual path and the virtual path 38, the processor will automatically adjust the trajectory of the work machine 12, as shown by steps 146 and 147. The processor controls the movement and trajectory of the work machine 26 by communicating with the work machine's motor control unit.

Figure 11:
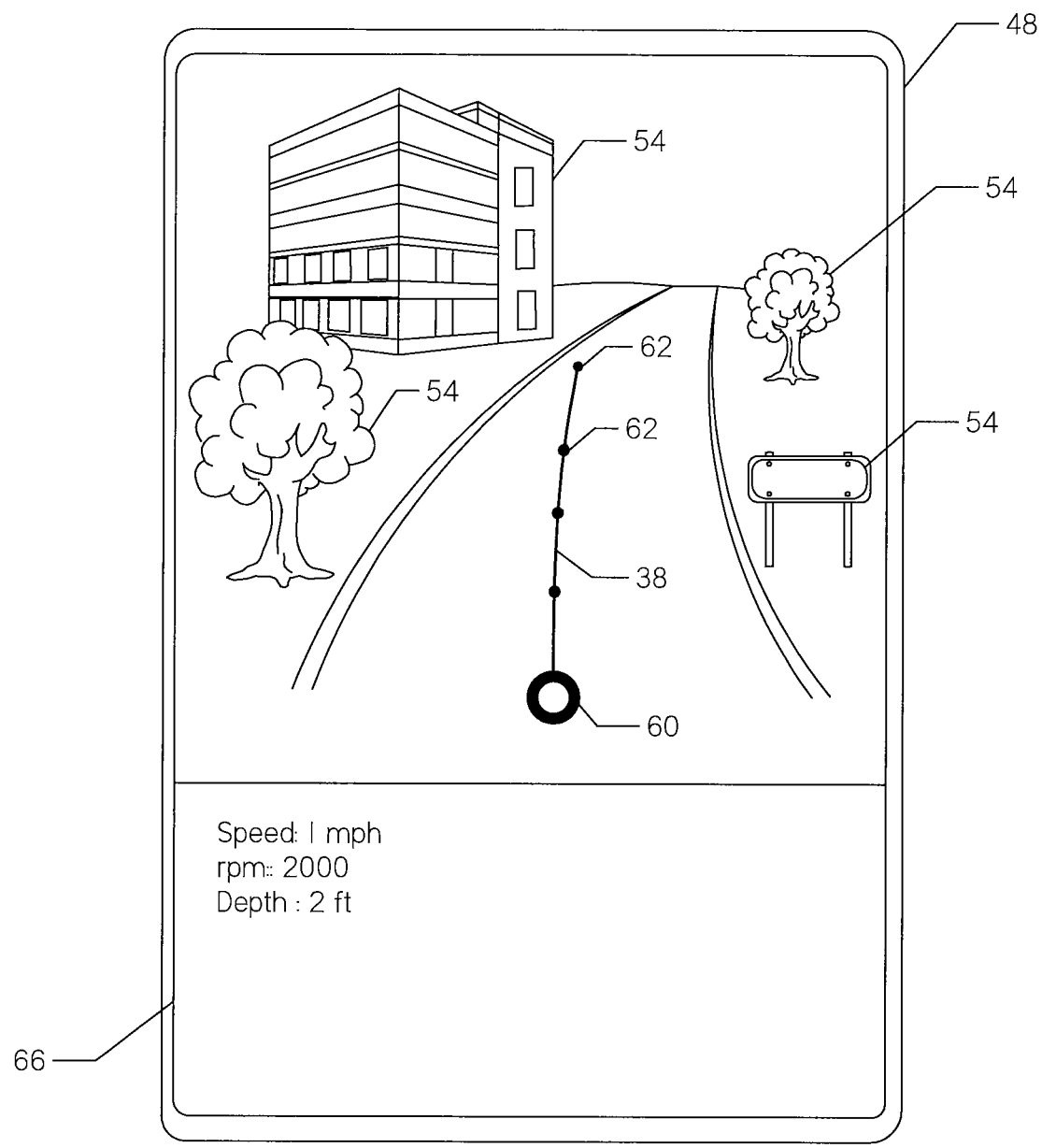
FIG. 11 is similar to FIG. 10, but shows a different virtual path on the display.
Figure 12:
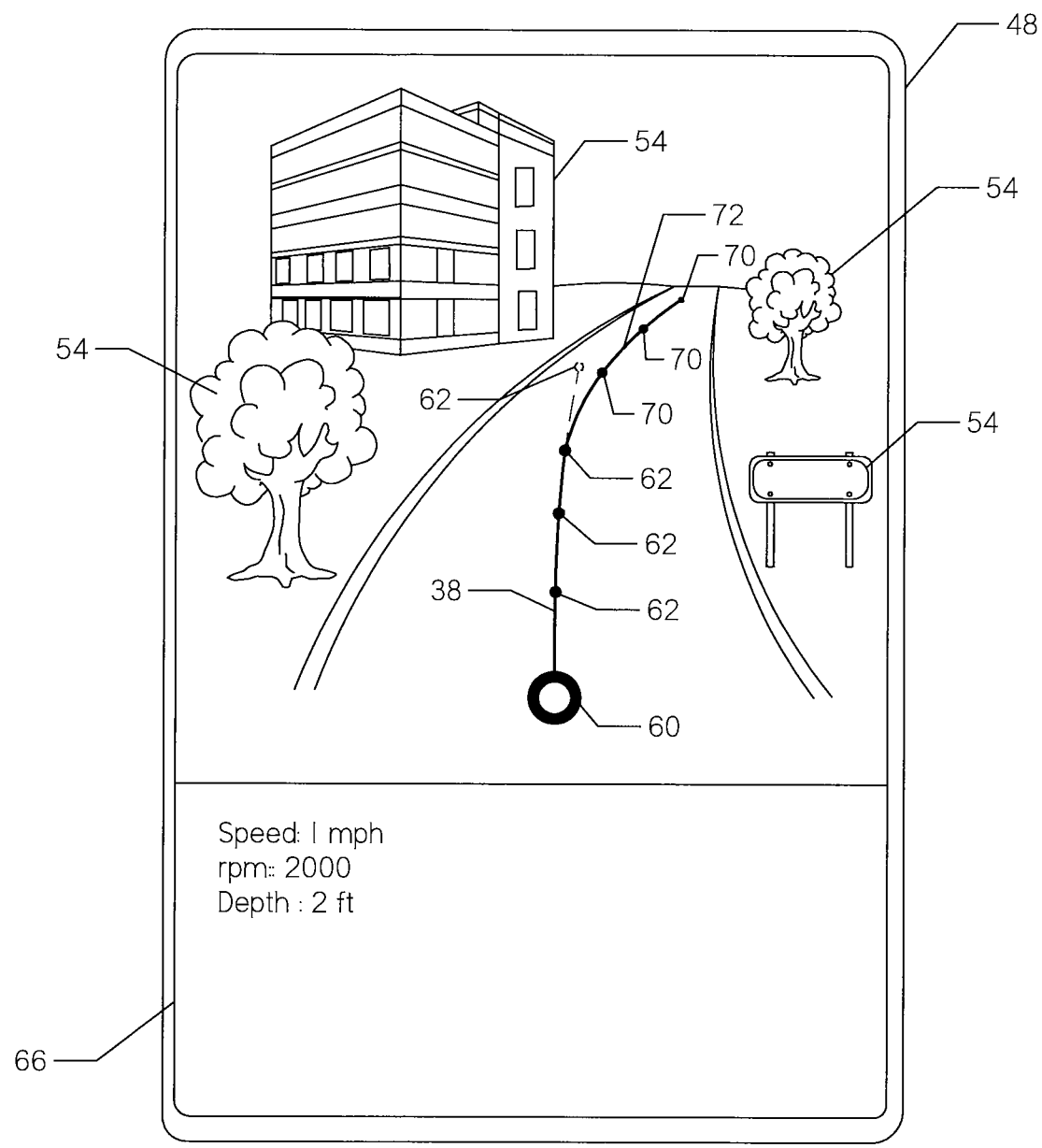
FIG. 12 shows the display of FIG. 11 at a later stage of operation of the guidance system. The untraversed portion of the virtual path has been adjusted. The deleted portion of the original virtual path is shown in dashed lines.
Figure 13:
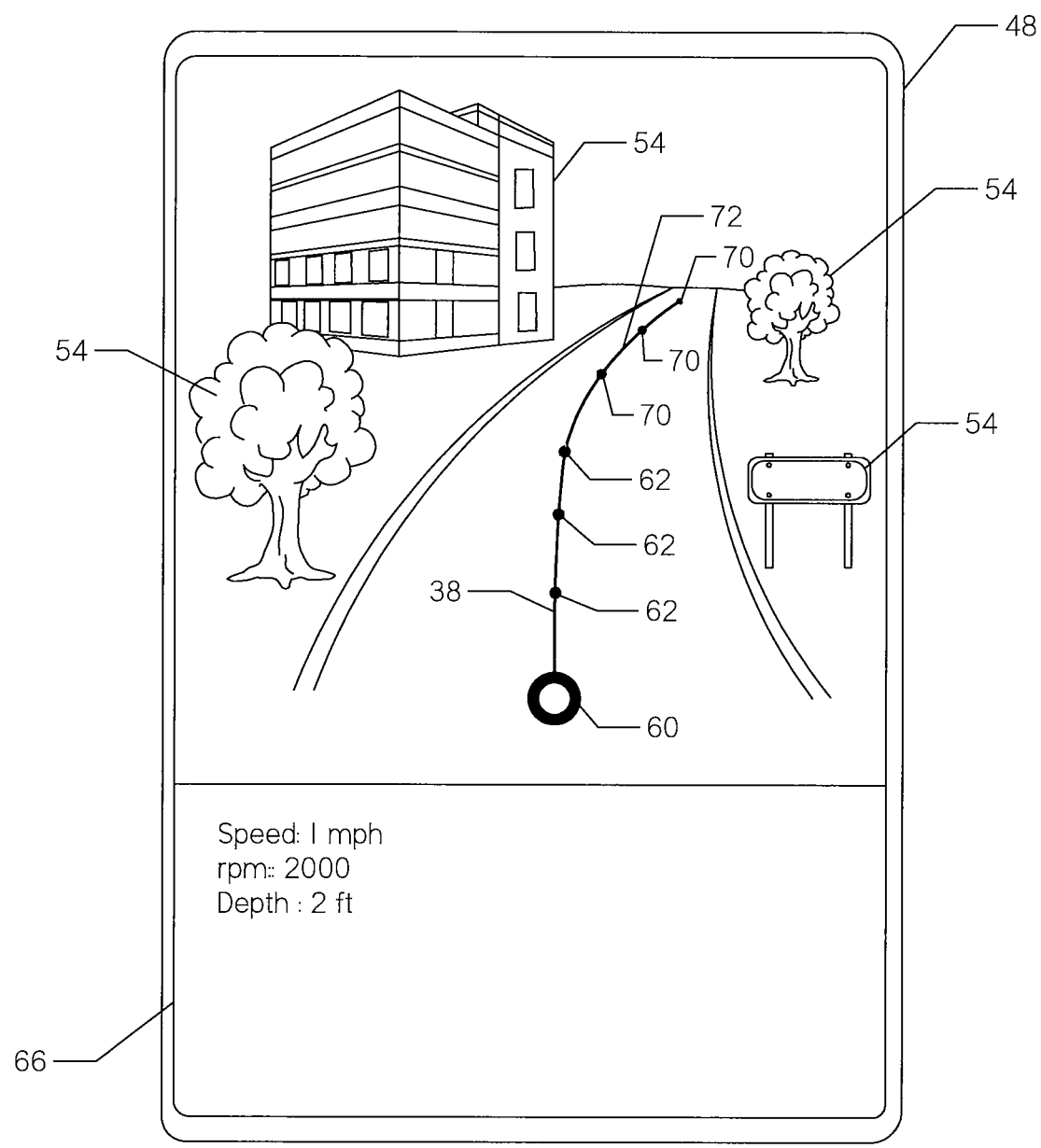
FIG. 13 is similar to FIG. 12. The deleted portion of the original virtual path is no longer displayed.

Turning to FIGS. 11-13, as the work machine 26 moves forward, the processor will continually update the spatial map based on the newly obtained image data. Images of the updated map are transmitted to the display 48 in real-time. Likewise, representations of untraversed portions of the virtual path 38 are juxtaposed with the updated images on the display 48 in real-time. Providing real-time imagery of the untraversed portions of the virtual path 38 allows the operator to edit or extend the virtual path 38 as conditions are analyzed, as shown for example in FIG. 12. For example, terrain which may have previously been over the horizon or otherwise not viewable by the camera 44 may now be viewable.

An operator may edit the virtual path 38 by inputting new waypoints 70 or a new section of path on the display 48, as shown in FIG. 12. The new path created by the new waypoints 70 must intersect with the virtual path 38 and be within the work machine's 26 steering tolerances. If, for example, the virtual path 38 is relatively straight and the operator's new section of path commands a steering direction that is significant, the system will notify the operator of an error.

The processor will automatically update the path and project the updated virtual path 72 on the display 48, as shown in FIG. 12. Any waypoints 62 outside of the updated virtual path 72 will be deleted from the display 48, as shown in FIG. 13. The above described process will continue until the actual path is complete, as shown by steps 148-150 in FIG. 7.

Figure 14:
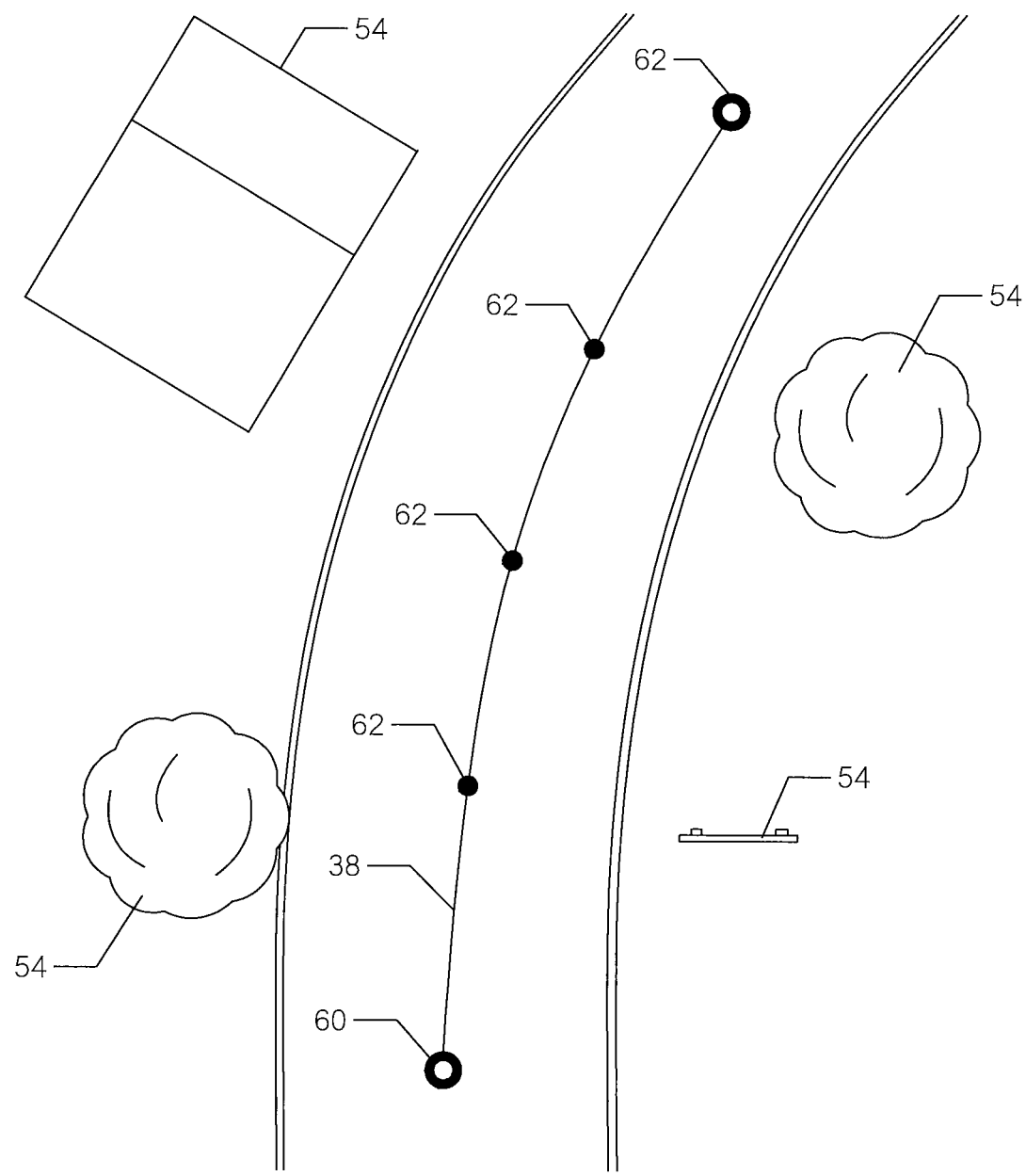
FIG. 14 is an overhead map of the virtual path shown in FIG. 11.

With reference to FIG. 14, the processor may also assign projected GPS coordinates to each waypoint 62 identified in the virtual path 38. Assigning GPS coordinates allows the virtual path 38 to be displayed on an aerial map, as shown in FIG. 14. Projected GPS coordinates may be assigned to the waypoints 62 using a GPS receiver and compass included in the vision system 40.

The GPS receiver and compass tell the processor the location and orientation of the onboard camera 44. Using such information and the previously calculated spatial positioning between the camera 44 and waypoints 62, the processor can determine a projected GPS location of each of the waypoints 62. For example, if one of the waypoints 62 is determined to be 10 feet forward and two feet to the right of the camera 44, the projected GPS location of that waypoint 62 is equivalent to the GPS location of the camera plus 10 feet forward and two feet to the right. During operation, the projected GPS coordinates may be compared to the GPS coordinates of the work machine's current position. In alternative embodiments, other known GNSS systems, cellular data, or any other types of navigational systems may be used with the above described method instead of GPS.

In an alternative embodiment, the operator may have navigational coordinates for a planned path prior to operation. If so, the operator may upload the planned path to the processor so that the processor may map the planned path within the spatial map using the coordinates. The planned path may be shown in the display as the virtual path, as shown by step 151 in FIG. 6.

Figure 15:
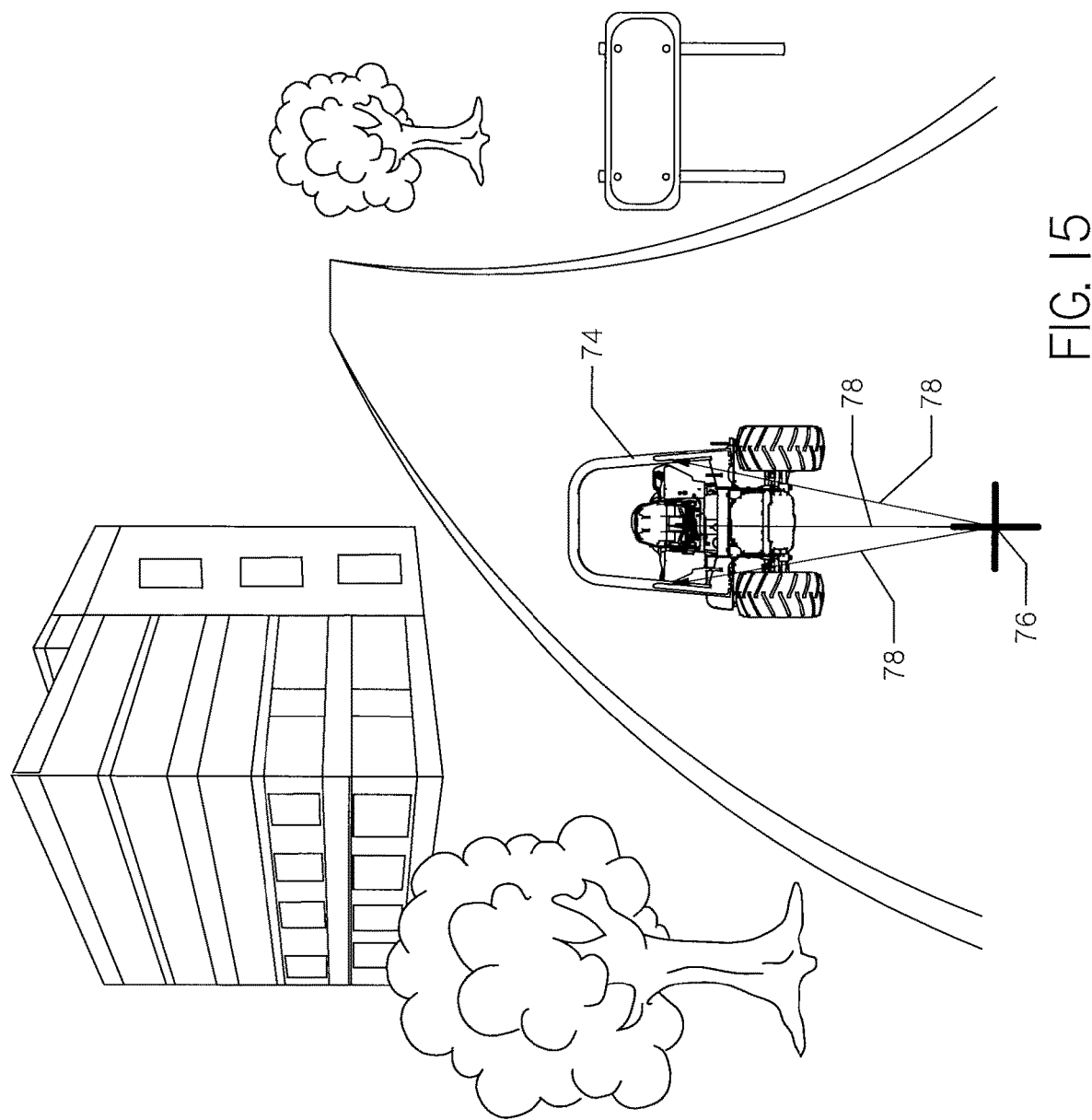
FIG. 15 shows a spatial map produced by a second embodiment of a guidance system. The map includes a representation of a second work machine.

Turning to FIG. 15, in an alternative embodiment, the guidance system may be used to identify a moving object. An operator may select a target object 74, such as a second work machine shown in FIG. 15. Image data captured by the vision system 40 is converted into a 3D spatial map. The processor locates a position of the camera 44, as shown by target symbol 76, and the target object 74 within the map. The spatial positioning between the camera 44 and target object 74 is measured, as shown for reference by the vectors 78. The processor is then programmed to maintain a predetermined distance and alignment from the target object 74. As the target object 74 moves, the work machine 10 or 26 will follow the target object 74 and create the actual trenched path.

Changes may be made in the construction, operation and arrangement of the various parts, elements, steps and procedures described herein without departing from the spirit and scope of the invention as described in the following claims.

The invention claimed is:

1. A method, comprising: capturing image data representative of one or more scenes in the vicinity of a self-propelled work machine; locating the work machine in relation to the imaged vicinity; receiving data about a virtual path for the work machine, the virtual path originating at the machine's then-current location; generating the virtual path within the captured image data using the received data; driving the work machine along an actual path; and comparing the actual path of the driven work machine to the virtual path; and as the work machine is driving along the actual path, adjusting the trajectory of the work machine in response to any deviation of the actual path from the virtual path.

2. The method of claim 1 in which the trajectory of the work machine is automatically adjusted.

3. The method of claim 1, further comprising:
modifying an untraversed portion of the virtual path after the work machine begins traversing its actual path.

4. The method of claim 1, further comprising:
juxtaposing representations of the virtual path and the imaged vicinity on a display.

5. The method of claim 4, further comprising:
updating the juxtaposed representations of the virtual path and the imaged vicinity on the display as the work machine is driven along the actual path.

6. The method of claim 1, further comprising:
touching a display; and
in which the received data is provided by a user's touching of the display.

7. The method of claim 1, further comprising:
engaging a work tool with a ground surface as the work machine is driven along the actual path.

8. The method of claim 1, further comprising:
creating a three-dimensional map of the imaged vicinity.

9. The method of claim 8 in which creating step uses structure-from-motion software.

10. The method of claim 1 in which the capturing step uses a camera.

11. The method of claim 1 in which the capturing step uses a 3D sensor.

12. The method of claim 1 in which the comparing step uses GPS measurements associated with points along the actual path.

13. The method of claim 1 in which the actual path is compared to the virtual path without the use of a georeferenced map.

14. The method of claim 1, further comprising:
measuring an acceleration rate and angular position of the work machine relative to a ground surface as the work machine is driven along the actual path.

15. The method of claim 1, in which the received data comprises a plurality of waypoints identified within the captured image data by external input.

16. The method of claim 15, further comprising:
assigning projected GPS coordinates to each of the plurality of waypoints; and
displaying the virtual path on an aerial map.

17. A method, comprising: capturing image data representative of one or more scenes in the vicinity of a self-propelled work machine; locating the work machine in relation to the imaged vicinity; receiving data about a virtual path for the work machine, the virtual path originating at the machine's then-current location; generating the virtual path within the captured image data using the received data; driving the work machine along an actual path; comparing the actual path of the driven work machine to the virtual path; and modifying an untraversed portion of the virtual path after the work machine begins traversing its actual path.

18. A method, comprising: capturing image data representative of one or more scenes in the vicinity of a self-propelled work machine; creating a three-dimensional map of the imaged vicinity; locating the work machine in relation to the imaged vicinity; receiving data about a virtual path for the work machine, the virtual path originating at the machine's then-current location; generating the virtual path within the captured image data using the received data; driving the work machine along an actual path; and comparing the actual path of the driven work machine to the virtual path.

19. The method of claim 18 in which the creating step uses structure-from-motion software.

* * * * *